United States Patent [19]

Schleicher

[11] E Re. 31,535

[45] Reissued Mar. 13, 1984

[54] SPOT CLINCH MEANS AND METHOD

[76] Inventor: Louis C. Schleicher, 1917 Marcastle Ct., Rochester, Mich. 48063

[21] Appl. No.: 774,851

[22] Filed: Mar. 7, 1977

Related U.S. Patent Documents

Reissue of:

[64] Patent No.: 3,900,937
Issued: Aug. 26, 1975
Appl. No.: 494,982
Filed: Aug. 5, 1974

[51] Int. Cl.[3] ..... B23P 19/00

[52] U.S. Cl. ..... 29/432.2; 29/21.1; 29/509; 29/521; 29/798

[58] Field of Search ..... 29/509, 521, 21.1, 432, 29/798, 432.1, 432.2, 283.5; 113/116 FF, 1 N

[56] References Cited

U.S. PATENT DOCUMENTS

| | | | |
|---|---|---|---|
| 318,221 | 5/1885 | Thompson et al. | 113/1 N |
| 2,254,558 | 9/1941 | Williams | 29/521 X |
| 2,924,312 | 2/1960 | Williams | 189/36 |
| 3,726,000 | 4/1973 | Hafner | 113/116 FF X |
| 3,771,216 | 11/1973 | Johnson | 29/509 |
| 3,862,485 | 1/1975 | Hafner | 29/798 |

*Primary Examiner*—Ervin M. Combs
*Attorney, Agent, or Firm*—William L. Fisher

[57] ABSTRACT

Spot clinch *apparatus and* method for forming a spot clinch joint by lancing and swaging two or more materials together using one complete stroke of a *ram driven by a* power source in a single station, [the power source having a power stroke and a retract stroke, said] *the* method utilizing an anvil, die and punch *arranged in a tool body,* [said] *the* method comprising [moving either the punch or anvil] *connecting the ram to the power source so that the ram is driven in a power stroke and a retract stroke, joining one of the punch and anvil to the ram and the other to the tool body, whereby one is made moveable* while [maintaining] the other *is maintained* stationary *in respect to the tool body* during the complete stroke of the [power source] *ram,* [moving] *and providing camming actions responsive to the stroking movement of the ram for controlling positioning of the die relative to the anvil and punch during the complete stroke of the ram, said* one of the punch and anvil *being moved* toward the other during a first part of the power stroke, [lancing] the materials *being lanced* by piercing them with the punch and die during a second part of the power stroke, [holding] *one of the camming actions controlling positioning of* the die in a first position [spaced from] *stationary in respect to* the anvil during both the first and second parts of the power stroke, [moving] *another camming action controlling movement of* the die *from its first position* to a second position *stationary* in respect to the anvil during a third part of the power stroke, [swaging] the lanced [portion] *portions* of the materials *being swagged with the punch and anvil* during a fourth and final part of the power stroke, [maintaining] *another camming action controlling positioning of* the die [and the anvil] in [the] *its* second position *stationary in respect to the anvil* during the fourth and final part of the power stroke and during a first part of the retract stroke, and [moving] *another camming action controlling movement of* the die relative to the anvil from [the] *its* second [position] to [the] *its* first position during a second and final part of the retract stroke[.], *providing a moveable die retainer for holding the die, the camming action controlling movement of the die and die retainer from said first to said second position being initiated by the continued movement of the ram in the third part of its power stroke, and the camming action controlling movement of the die and die retainer from the second to the first position being initiated by the continued movement of the ram in the second and final part of its retract stroke.*

8 Claims, 17 Drawing Figures

SPOT CLINCH MEANS AND METHOD

Matter enclosed in heavy brackets [ ] appears in the original patent but forms no part of this reissue specification; matter printed in italics indicates the additions made by reissue.

*This application is a reissue application of my original application Ser. No. 494,982 now U.S. Pat. No. 3,900,937.*

My invention relates to means and method for fastening two or more materials together utilizing a punch and die mechanism wherein the materials are lanced and swaged to fasten them together.

There are many conventional methods of fastening sheet materials together by lancing and swaging including the use of a punch and die in two separate stations, or two separately actuatable rams in a single station. Also it is known to use a single station by the use of a spring actuated expanding die or by a spring actuated swaging punch.

The principal [obejct] *object* of my invention is to accomplish the fastening of two or more sheet materials with method and apparatus using one complete stroke of a *ram driven by a* power source in a single station and without the necessity of an expandable die or expandable swaging punch.

Another object of my invention is to achieve a compact, self-contained mechanism which can be easily transported to the materials being fastened, as well as be mounted fast to a table, bench or the like.

The foregoing objects of my invention and the advantages thereof will become apparent during the course of the following description, taken in conjunction with the accompanying drawings, in which.

Figure 6:
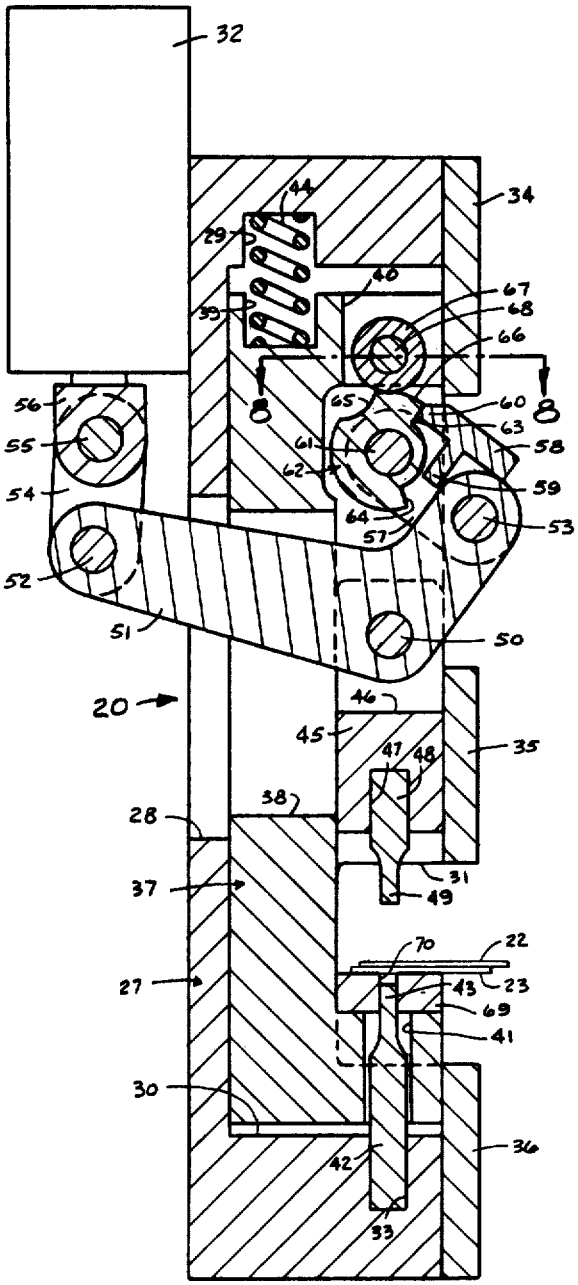
FIG. 6 is a vertical sectional view of a spot clinching tool embodying my invention shown in fully open starting position.
Figure 16:
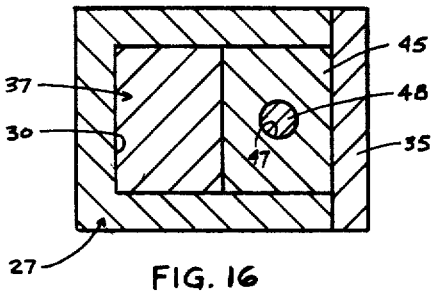
Figure 14:
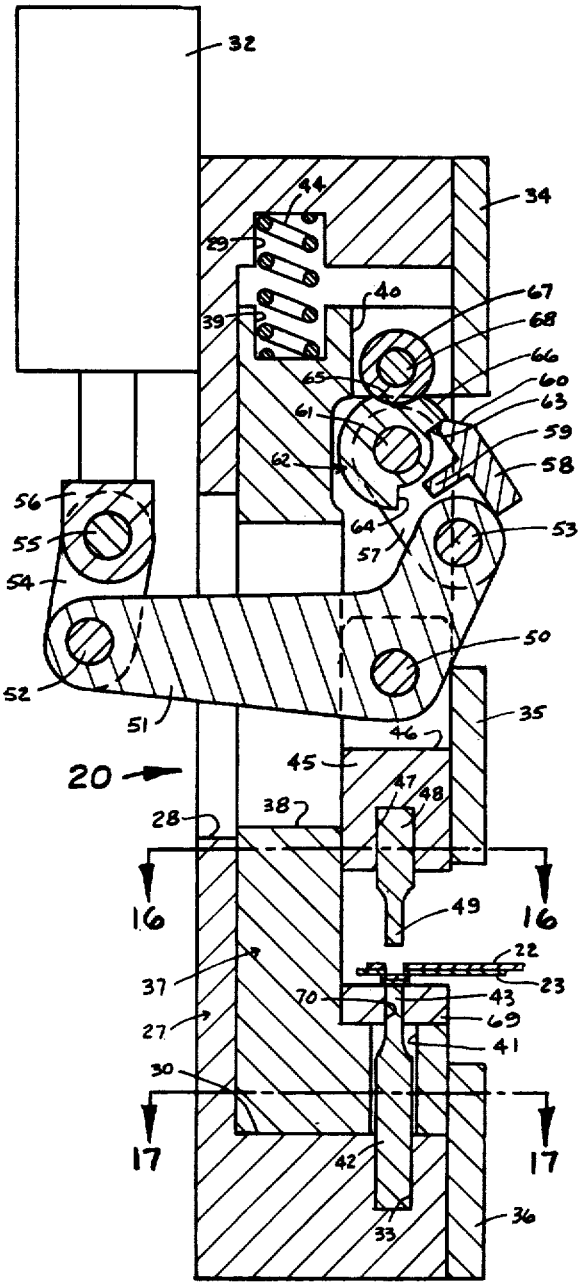
FIG. 14 is a sectional view like FIG. 6 but with said tool shown in a return position of the retract stroke where the punch has retracted from the lanced portion of the joint.
Figure 17:
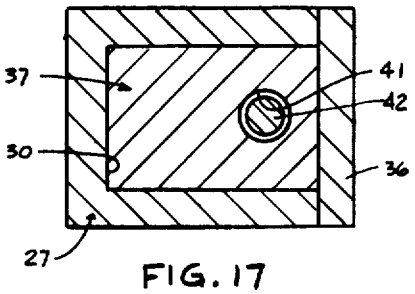
Figure 15:
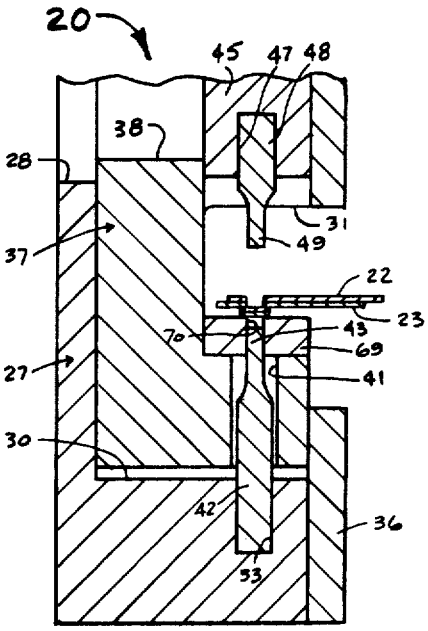

FIG. 15 is a sectional view like FIG. 6 but with parts removed and with said tool shown in the final position of the retract stroke where the die has been cammed above the anvil and the punch has been fully retracted and in position to start the next power stroke; and FIGS. 16 and 17 are horizontal sectional views of the structure of FIG. 14 taken, respectively, along the lines 16—16 and 17—17 thereof.

Referring to the drawings in greater detail, 20 generally designates said spot clinch tool and 21 said spot clinch joint formed thereby. Said tool 20 includes a main body 27 which houses or holds the other parts. The main body 27 consists of a large block of metal having a cavity 30, a crank aperture 28, a spring cavity 29, an access aperture 31, and an anvil-holding aperture 33 formed therein. Mounted to said body 27 is a power source 32 which imparts reciprocating motion to a crank 51 of the spot clinch tool 20. *Said crank 51 is connected to a punch retainer 45 which serves as a ram.* Said power source 32 has one complete stroke consisting first of a power stroke and second (and lastly) of a retract stroke. In the instance, said power source 32 is a pneumatic cylinder having a piston rod having a rod end 56. A link 54 is connected to said rod end 56 by a pin 55 and to said crank 51 by a pin 52. Said crank 51 is also connected to [a] *said* punch retainer 45 by a pin 50 and to a pair of links 57 by a pin 53. *Said ram or punch retainer 45, like said power source 32, has one complete stroke consisting of a power stroke and a retract stroke.* Said links 57 are connected to said body 27 by a pin 61. Rigidly mounted to said links 57 is a cam actuator 58 which has spaced apart cam actuating fingers 59 and 60. Mounted between said links 57 and on said pin 61 is a cam 62 which includes a cam depression 65, spaced apart cam shoulders 63 and 64 which provide another cam depression therebetween and a cam land 66. Operating in conjunction with said cam 62 is a cam follower 67 which is connected to die retainer 37 by a pin 68 in an aperture 40. Said die retainer 37 consists of another block of metal having spring cavity 39, cam follower aperture 40, a crank aperture 38, and an anvil clearance aperture 41 formed therein. Said die retainer 37 is vertically moveable in said cavity 30 upwardly by said cam 62 and downwardly by a compression spring 44. A die 69 is mounted fast to the lower end of said die retainer 37 and contains an anvil aperture 70. An anvil 42 is rigidly mounted to said body 27 in said anvil-holding aperture 33. An operative end 43 of said anvil 42 fits slidably into said aperture 70 of said die 69. Cover plates 34, 35 and 36 serve to contain said die retainer 37 and [a] *said* punch retainer 45 in said cavity 30. Said punch retainer 45, which is connected to said crank 51 by said pin 50, consists of another block of metal having a crank aperture 46 and a punch-holding aperture 47 formed therein. A punch 48 is rigidly mounted to said punch retainer 45. Said spring 44 is contained by said spring cavities 29 and 39 and serves to keep said cam follower 67 in contact with said cam 62.

Figure 1:
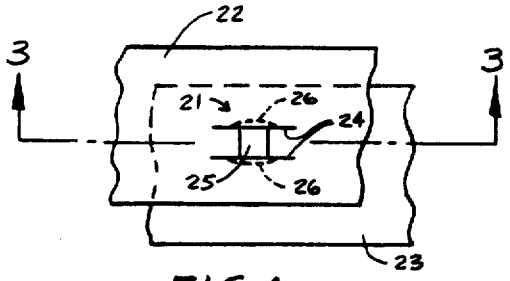
FIGS. 1 and 2 are, respectively, top and bottom plan views of two metal sheets fastened together by a spot clinch joint formed by lancing and swaging in accordance with my invention.
Figure 2:
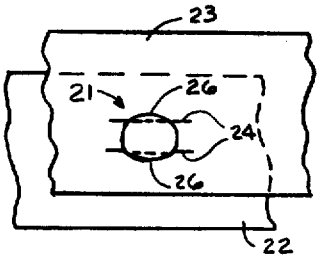
Figure 3:
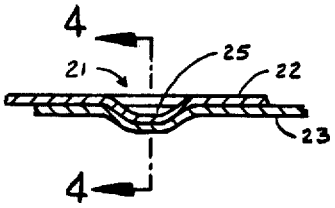
FIG. 3 is a longitudinal sectional view of the structure of FIG. 1 taken along the line 3—3 thereof.
Figure 4:
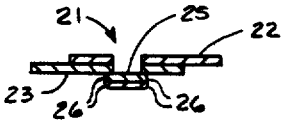
FIG. 4 is a transverse sectional view of the structure of FIG. 3 taken along the line line 4—4 thereof.
Figure 5:
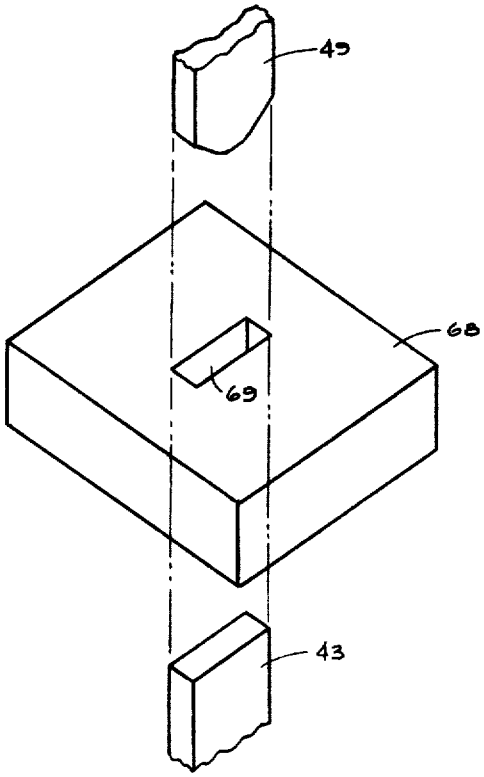
FIG. 5 is a perspective view of a typical punch, die and anvil set used in my invention.
Figure 8:
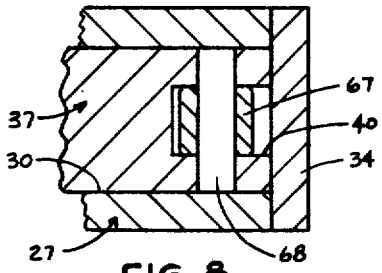
FIG. 8 is horizontal sectional view of the structure of FIG. 6 taken along the line 8—8 thereof.
Figure 9:
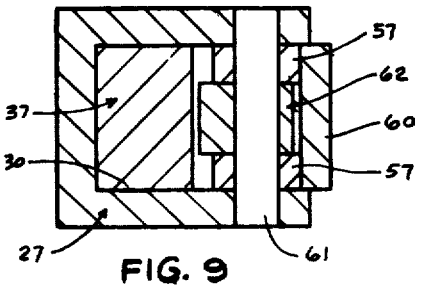
FIG. 9 is a horizontal sectional view of the structure of FIG. 7 taken along the line 9—9 thereof.
Figure 7:
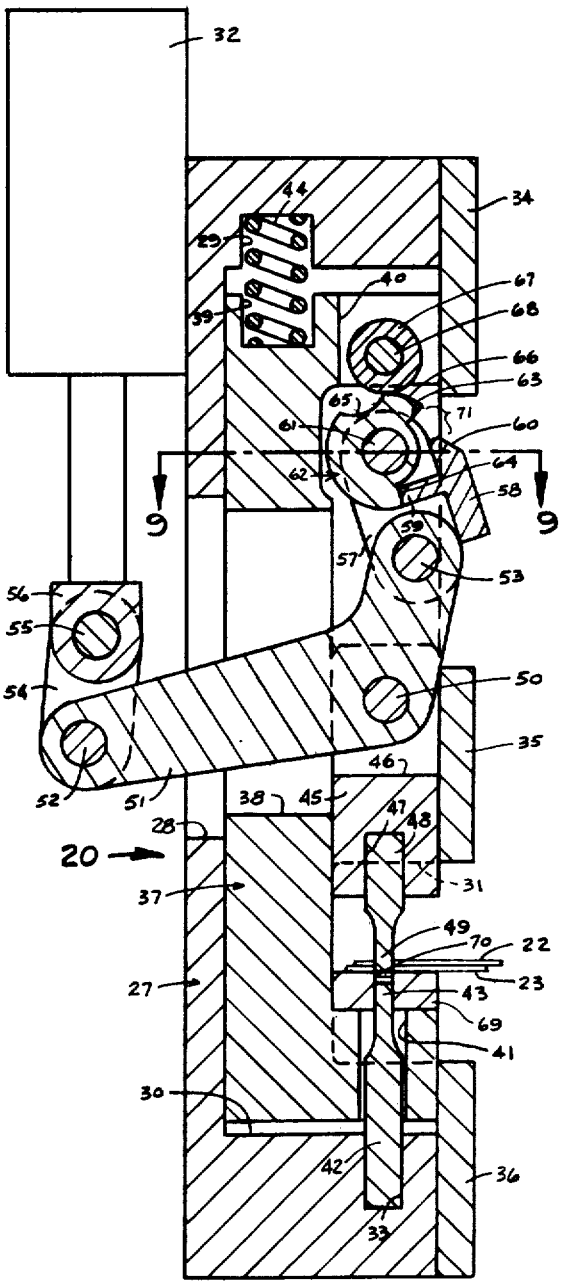
FIG. 7 is a sectional view like FIG. 6 but with said tool shown in a forward position of the power stroke where the lancing of the sheets has just been completed.
Figure 12:
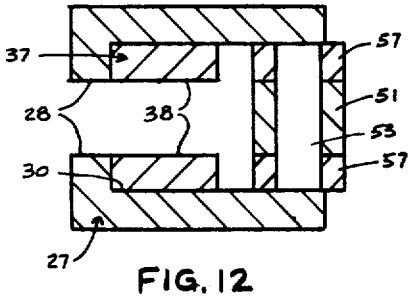
FIG. 12 is a horizontal sectional view of the structure of FIG. 10 taken along the line 12—12 thereof.
Figure 13:
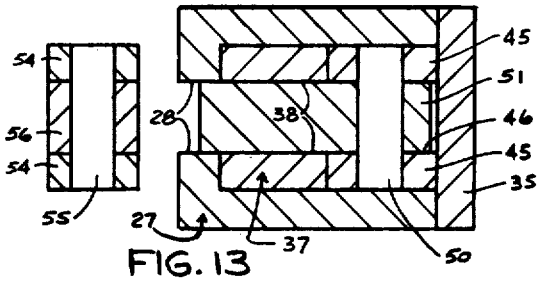
FIG. 13 is a horizontal sectional view of the structure of FIG. 11 taken along the line 13—13 thereof.
Figure 10:
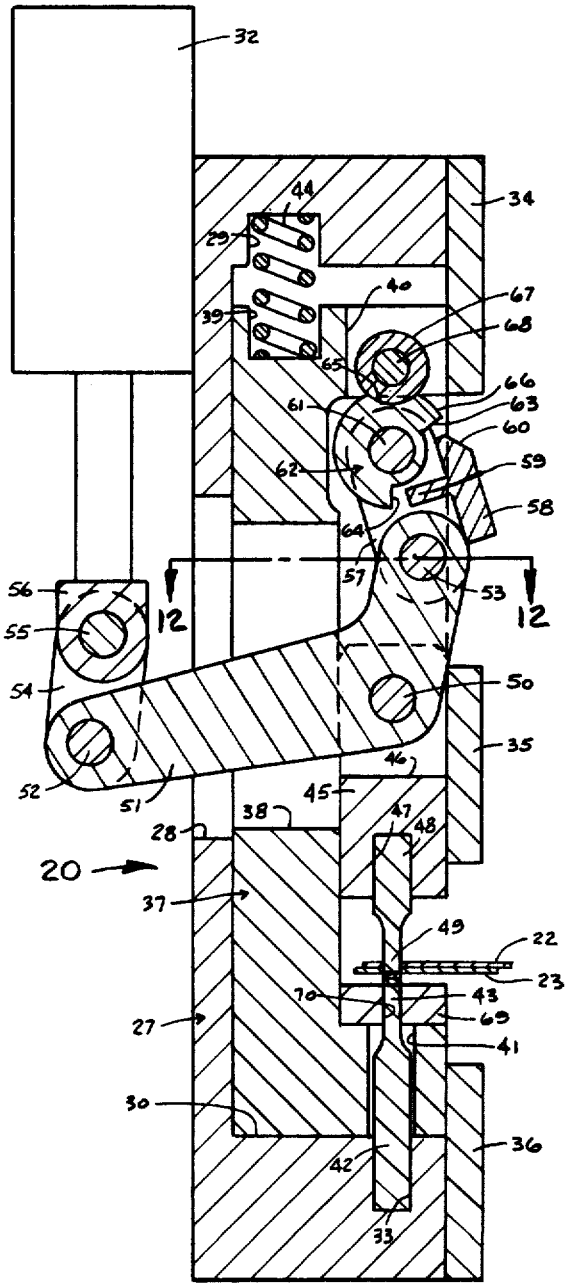
FIG. 10 is a sectional view like FIG. 6 but with said tool shown in a further forward position of the power stroke where the die has just retracted.
Figure 11:
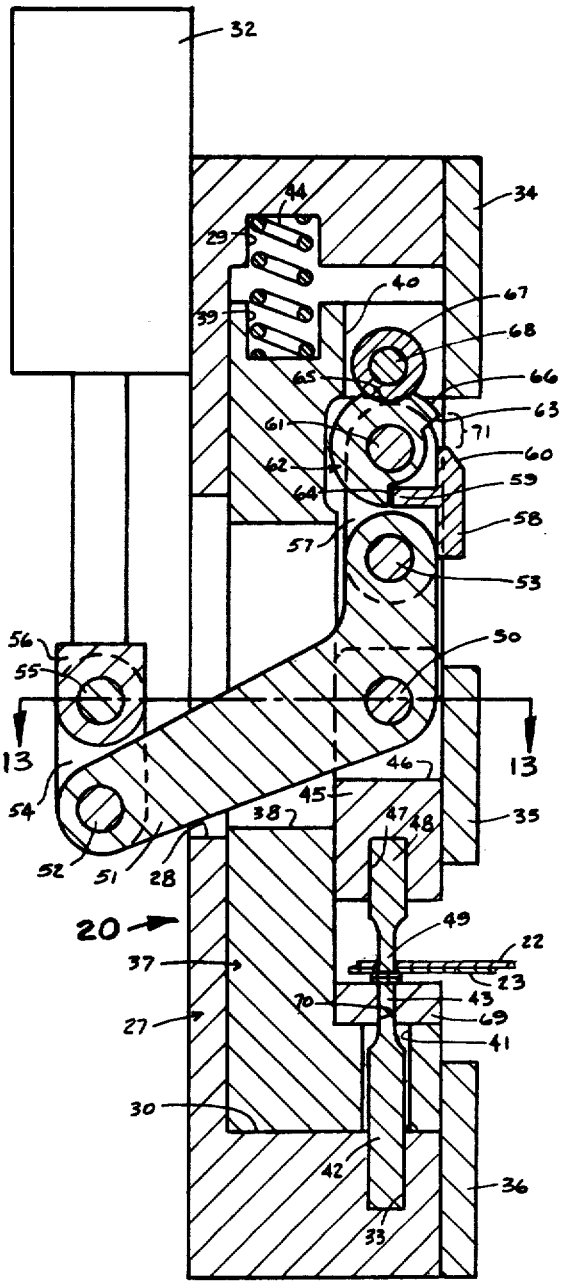
FIG. 11 is a sectional view like FIG. 6 but with said tool shown in the fully forward position of the power stroke where the lanced portion of the joint has been swaged.

FIG. 6 shows the spot clinch tool 20 at the beginning of the power stroke of said power source 32 *and of said ram (or punch retainer 45)* with said cam actuating finger 60 engaged with said cam shoulder 63 and holding said cam follower 67 on said cam land 66 which in turn compresses said spring 44 and holds said die 69 above said anvil operative end 43 and punch operative end 49 above said die 69, all within said access aperture 31. The work in the form of metal sheets 22 and 23, in the instance, is either fed into said access aperture 31 and laid upon said die 69 in proper position beneath said punch 48 where the joint 21 is to be formed therein or said sheets 22 and 23 are held stationary and said tool 20 is moved into position around said sheets 22 and 23 so that the latter are disposed in said access aperture 31 to form said joint 21 therein [were] *where* desired. During a first part of said power stroke said operative end 49 of said punch 48 is moved toward said die 69 and during a second part of said power stroke said punch 48 lances the sheets 22 and 23 through as shown in FIG. 7, forming a depression 25 in said joint 21. The pins 50, 53 and 61, along with the crank 51 and the links 57, constitute a three pin toggle mechanism in which said pin 61 remains stationary while said pin 50 moves up and down and said pin 53 moves in and out of alignment with said pins 50 and 61. When said pin 53 is aligned with said pins 50 and 61 the toggle mechanism is locked and when said pin 53 is out of alignment with said pins 50 and 61 the toggle mechanism is unlocked. Such movement of said punch 48 is accomplished directly by said toggle mechanism consequent upon initial downward movement of the rod end 56. Said toggle mechanism connects said punch 48 to said power source 32 so that the latter drives the former in a substantially harmonic motion in respect to the base 27 and so that first and second multiplications of the force of said power source 32 are achieved during the lancing and swaging steps, respectively, in the formation of said joint 21. The lancing by the punch 48 is fully completed before said pin 53 moves into its lock position. While the lancing is being accomplished, the cam actuating finger 59 advances toward said cam shoulder 64 and rotates said cam 62 so that during a third part of the power stroke the cam 62 is positioned to allow said cam follower 67 to enter said cam depression 65 as urged by said spring 44, thus retracting said die 69 below operative end 49 of said punch 48, as shown in FIG. 10. Retraction of said die 69 below said operative end 49 as shown in FIG. 10 prior to the subsequent swaging step to be described prepares the way and makes room for the expulsion of the swaged material on the side of the metal sheets 22 and 23 opposite that from which said depression 25 is formed, particularly as shown at 26 in FIG. 4. During such movement of said die 69 the shoulder 64 leaves the finger 59 upon rotation of the cam 62 by the cam follower 67. Such movement of said die 69 is accomplished indirectly by said toggle mechanism consequent upon further downward movement of said rod end 56 and directly by said cam follower 67 moving into said cam depression 65. During a fourth and final part of said power stroke the operative end 49 of said punch 48 is moved toward said operative end 43 of said anvil 42 and swages the lanced portions of the sheets 22 and 23 as shown in FIG. 11. Such movement of said punch 48 is accomplished directly by said toggle mechanism moving to lock position consequent upon final downward movement of said rod end 56. Multiplication of the force of said power source 32 by said toggle mechanism is at a maximum during this swaging step. The swaging by said punch 48 is completed by completion of the movement of the pin 53 into its lock position at the end of the power stroke of said power source 32. During this swaging step the lanced portions of the sheets 22 and 23 are enlarged or expulsed, as at 26, to a greater dimension than the depression 25 so that the joint 21 is completely and permanently locked.

During a first part of the retract stroke of said power source 32 *and of said ram* (*or punch retainer 45*) said punch 48 is moved away from said anvil 42 and out of said depression 25 before said die 69 is moved as shown in FIG. 14. During such movement of said punch 48 the finger 60 moves toward the shoulder 63 in a lost motion action (by reason of said cam depression between the cam shoulders 63 and 64 being greater in dimension than the space between said fingers 59 and 60) so that all movement of said die 69 is prevented during upward retraction of said operative end 49 out of said depression 25 and away from said sheets 22 and 23 to insure that the joint 21 just [formed and finally swages] *made* is not in any way deformed or impaired by said die 69. Such movement of the punch 48 is accomplished directly by said toggle mechanism moving out of its lock position consequent upon initial upward movement of said rod end 56. Said lost motion action is designated 71 (see FIGS. 7 and 11) and allows said crank 51 to raise said punch 48 before said cam actuating finger 60 contacts said cam shoulder 63 in said retract stroke. During a second and final part of said retract stroke said die 69 is raised back to its starting position as shown in FIG. 15. The upper end of FIG. 15 (not shown) is identical to that shown in FIG. 6. Such movement of said die 69 is accomplished indirectly by said toggle mechanism consequent upon final upward movement of said rod end 56 and directly by said cam follower 67 being moved out of said cam depression 65 by virtue of said cam finger 60 pushing upon said shoulders 63 to raise said cam follower 67 upon said cam land 66. During such movement of said die 69 the parts of said tool 20 are moved back to their respective initial starting positions including said spring 44 which is compressed to its initial starting condition. The work is either removed from said access aperture 31 and a new work inserted in its place and the aforementioned operation repeated or the same work can be indexed to a new position to form repeated spaced apart joints therein (sometimes referred to as a mechanical stitch seam consisting of said spaced apart joints) or the tool 20 is moved, while the work is held stationary, either to a new work or indexed in respect to the same work to form said mechanical stitch seam. The tool 20 is operative not only in the vertical position shown but in an overhead or any other position in which said tool 20 may be oriented.

The tool 20 is operated in said one complete stroke of said power source 32 *and of said ram* (*or punch retainer 45*) and during such operation of said tool 20 the punch 48 moves in respect to the base 27 in a substantially harmonic motion during said complete stroke of said power source 32 *and of said ram* (*or punch retainer 45*) due to the action of said toggle mechanism. The anvil 42 remains stationary in respect to said base 27 all during the operation of said tool 20. During the first part of the power stroke said punch 48 moves downwardly to meet the anvil 42 and thereafter the lancing step is accomplished during a second part of said power stroke by said punch 48 piercing through the metal sheets 22 and 23 and forming said depression 25 while said die 69 is maintained elevated in respect to said anvil 42. A first force multiplication of said power source 32 is achieved at the punch 48 by said toggle mechanism during this lancing step. Upon completion of the lancing step said die 69 is lowered during a third part of said power stroke to the operative end 43 of said anvil 42 to accomodate the expulsion or cold flow of the work which will occur during the subsequent swaging step. During the fourth and final part of the power stroke the lanced portions of the metal sheets 22 and 23 are swaged by movement of said punch 48 to its maximum close position in respect to the anvil 42. Force multiplication of the power source 32 by said toggle mechanism at said punch 48 is at a maximum and said expulsion 26 of said lanced portions occurs during said [swaaging] *swaging* step. The retract stroke of said power source 32 *and of said ram (or punch retainer 45)* commmences upon completion of said swaging step and during the first part of said retract stroke said die 69 is maintained stationary in respect to said operative end 43 by said lost motion arrangement to insure movement of the punch 48 out of said depression 25 and above the work prior to any movement whatsoever of said die 69. During the second and final part of said retract stroke the die 69 is raised above said operative end 43 and the punch 48 is raised further above the work so that said die 69 and said punch 48 assume their respective initial starting positions.

It will thus be seen that there has been provided by my invention method and means of forming a clinch joint in which the objects hereinabove set forth, together with many thoroughly practical advantages, have been successfully achieved. While a preferred embodiment of my invention has been shown and described, it is to be understood that variations and changes may be resorted to without departing from the spirit of my invention as defined by the appended claims.

What I claim is:

1. Spot clinch tool for forming a spot clinch joint by lancing and swaging two or more materials together using one complete stroke of a *ram driven by a* power source in a single station, [said power source having a power stroke and a retract stroke,] said tool *having a tool body and* utilizing an anvil, die, and punch *ram moving* means [for moving] *connecting said ram to said power source so that said ram is driven in a power stroke and a retract stroke, means joining* one of said punch and anvil *to said ram and the other to said tool body, whereby one is made moveable* while [maintaining] the other *is maintained* stationary *in respect to said tool body* during said complete stroke of said [power source] *ram,* [means for moving] *and cam means coupled to said ram moving means responsive to the stroking movement of said ram for controlling positioning of said die relative to said anvil and punch during said complete stroke of said ram, said* one of said punch and anvil *being moved* toward the other during a first part of said power stroke, [means for piercing] said materials *being pierced* with said punch and die to lance them during a second part of said power stroke, [means for holding the] *said cam means controlling positioning of said* die in a first position [spaced from the] *stationary in respect to said* anvil during both said first and second parts of said power stroke, [means for moving the] *said cam means controlling movement of said* die *from said first position* to a second position *stationary* in respect to said anvil during a third part of said power stroke, [means for swaging] the lanced portions of said materials *being swaged* with said punch and anvil during a fourth and final part of said power stroke, [means for maintaining the] *said cam means controlling positioning of said* die [and the anvil] in said second position *stationary in respect to said anvil* during said fourth and final part of said power stroke and during a first part of said retract stroke, and [means for moving] *said cam means controlling movement of* said die relative to said anvil from said second position to said first position during a second and final part of said retract stroke, *means for holding said die including a moveable die retainer for holding the die, said cam means being actuated to control movement of said die and die retainer from said first to said second position by the continued movement of said ram in said third part of said power stroke, and said cam means being actuated to control movement of said die and die retainer from said second to said first position by the continued movement of said ram in said second and final part of said retract stroke.*

2. Spot clinch tool as claimed in claim 1 in which said *punch is made moveable by being joined to the ram and the* anvil [is maintained stationary during said complete stroke of said power source] *is made stationary by being joined to the tool body* and [further comprising] *in which said ram moving means includes* a toggle mechanism, [said toggle mechanism moveable during said complete stroke of said power source for moving said punch in a substantially harmonic motion in respect to said anvil during said complete stroke of said power source,] said toggle mechanism achieving [first and second] force multiplications at said punch of the force of said power source [during said lancing and swaging steps, respectively, cam means, cam actuator means for actuating said cam means, said cam actuator means operative during movement of said toggle mechanism, said cam means and said cam actuator means together holding said die stationary in said first position during both said first and second parts of said power stroke and moving said die to said second position during said third part of said power stroke and maintaining said die stationary in said second position during said fourth and final part of said power stroke and during said first part of said retract stroke, and moving said die from said second position to said first position and maintaining said die stationary in said first position during said second and final part of said retract stroke], *and said cam means coupled between said die retainer and said toggle mechanism whereby said die retainer is maintained stationary in respect to the tool body in each of said first and second positions relative to the anvil.*

3. Spot clinch tool as claimed in claim 2 *in which said cam means includes a cam, a cam follower, and a cam actuator, said cam follower joined to said die retainer, said cam means and cam actuator joined to said toggle mechanism,* said cam means [having a depression formed therein so that during said first part of said retract stroke said cam means remains stationary during movement of said cam actuator means] *operative* to maintain said die *in said second position* stationary *in respect to said anvil* to permit movement of the punch away from the anvil during said first part of said retract stroke and prior to final movement of said die *retainer* to [its] *an* initial starting position.

4. Spot clinch tool as claimed in [claim 2 further comprising, cam follower means operative upon said cam means, a die retainer means for holding said die, said cam follower means fast in respect to said die retainer means, and] *claim 1 further comprising* yieldable means operatie upon said die retainer [means] for [maintaining said cam follower means biased against said cam means] *moving same from said first to said second position in response to a camming action of said cam means.*

5. Spot clinch method for forming a spot clinch joint by lancing and swaging two or more materials together using one complete stroke of a *ram driven by a* power source in a single station, [said power source having a power stroke and a retract stroke,] said method utilizing an anvil, die, and punch *arranged in a tool body*, said method comprising [moving] *connecting said ram to said power source so that said ram is driven in a power stroke and a retract stroke, joining* one of said punch and anvil *to said ram and the other to said tool body, whereby one is made moveable* while [maintaining] the other *is maintained* stationary *in respect to said tool body* during said complete stroke of said [power source] *ram, and providing camming actions responsive to the stroking movement of said ram for controlling positioning of said die relative to said anvil and punch during said complete stroke of said ram*, moving said one of said punch and anvil toward the other during a first part of said power stroke, lancing said materials by piercing them with said punch and die during a second part of said power stroke, [holding the] *one of said camming actions controlling positioning of said* die in a first position [spaced from the] *stationary in respect to said* anvil during both said first and second parts of said power stroke, [moving the] *another camming action controlling movement of said* die *from said first position* to a second position *stationary* in respect to said anvil during a third part of said power stroke, swaging the lanced portion of said materials with said punch and anvil during a fourth and final part of said power stroke, [maintaining the] *another camming action controlling positioning of said* die [and the anvil] in said second position *stationary in respect to said anvil* during said fourth and final part of said power stroke and during a first part of said retract stroke, and [moving] *another camming action controlling movement of* said die relative to said anvil from said second [position] to said first position during a second and final part of said retract stroke, *providing a moveable die retainer for holding said die, said camming action controlling movement of said die and die retainer from said first to said second position being initiated by the continued movement of said ram in said third part of said power stroke, and said camming action controlling movement of said die and die retainer from said second to said first position being initiated by the continued movement of said ram in said second and final part of said retract stroke.*

6. Spot clinch method as claimed in claim [1] *5* in which said *punch is made moveable by being joined to said ram and said* anvil is [maintained] *made* stationary [and said punch is moved in a substantially harmonic motion in respect to said anvil during said complete stroke of said power source] *by being joined to said tool body*, and in which [said die is held stationary in said first position during both said first and second parts of said power stroke and moved to said second position during said third part of said power stroke and maintained stationary in said second position during said fourth and final part of said power stroke and during said first part of said retract stroke, and moved from said second to said first position and maintained stationary in said first position during said second and final part of said retract stroke] *a toggle action is used in the connection between the ram and the power source to achieve force multiplications at said punch of the force of said power source, said camming actions being coupled to said toggle action, whereby said die retainer is maintained stationary in respect to said tool body in each of said first and second positions relative to said anvil.*

*7. Spot clinch tool for forming a spot clinch joint by lancing and swaging two or more materials together using one complete stroke of a ram driven by a power source in a single station, said tool having a tool body and utilizing an anvil, die and punch, ram moving means connecting said ram to said power source so that said ram is driven in a power stroke and a retract stroke, means joining said punch to said ram and said anvil to said tool body, whereby said punch is made moveable while said anvil is maintained stationary in respect to said tool body during the complete stroke of said ram, and cam means coupled to said ram moving means responsive to the stroking movement of said ram for controlling positioning of said die relative to said anvil and punch during said complete stroke of said ram, said punch being moved toward said anvil during a first part of said power stroke, said materials being pierced with said punch and die to lance them during a second part of said power stroke, said cam means controlling positioning of said die in a first position stationary in respect to said anvil during both said first and second parts of said power stroke, said cam means controlling movement of said die from said first position to a second position stationary in respect to said anvil during a third part of said power stroke, the lanced portions of said materials being swaged with said punch and anvil during a fourth and final part of said power stroke, said cam means controlling positioning of said die in said second position stationary in respect to said anvil during said fourth and final part of said power stroke and during a first part of said retract stroke, and said cam means controlling movement of said die relative to said anvil from said second position to said first position during a second and final part of said retract stroke, means for holding said die including a moveable die retainer therefor, said cam means being actuated to control movement of said die and die retainer from said first to said second position by the continued movement of said ram in said third part of said power stroke, and said cam means being actuated to control movement of said die and die retainer from said second to said first position by the continued movement of said ram in said second and final part of said retract.*

*8. Spot clinch method for forming a spot clinch joint by lancing and swaging two or more materials together using one complete stroke of a ram driven by a power source in a single station, said ram having a power stroke and a retract stroke, said method utilizing an anvil, die and punch arranged in a tool body, said method comprising connecting said ram to said power source so that said ram is driven in a power stroke and a retract stroke, joining said punch to said ram and said anvil to said tool body, whereby said punch is made moveable while said anvil is maintained stationary in respect to said tool body during said complete stroke of said ram, and providing camming actions responsive to the stroking movement of said ram for controlling positioning of said die relative to said anvil and punch during said complete stroke of said ram, moving said punch toward said anvil during a first part of said power stroke, lancing said materials by piercing them with said punch and die during a second part of said power stroke, one of said camming actions controlling positioning of said die in a first position stationary in respect to said anvil during both said first and second parts of said power stroke, another camming action controlling movement of the die from said first position to a second position stationary in respect to said anvil during a third part of said power stroke, swaging the lanced portion of said materials with said punch and anvil during a fourth and final part of said power stroke, another camming action controlling positioning of said die in said second position stationary in respect to said anvil during said fourth and final part of said power*

*stroke and during a first part of said retract stroke, and another camming action controlling movement of said die relative to said anvil from said second to said first position during a second and final part of said retract stroke, providing a moveable die retainer for holding said die, said camming action controlling movement of said die and die retainer from said first to said second position being initiated by the continued movement of said ram in said third part of said power stroke, and said camming action controlling movement of said die and die retainer from said second to said first position being initiated by the continued movement of said ram in said second and final part of said retract stroke.*

* * * * *

UNITED STATES PATENT AND TRADEMARK OFFICE

CERTIFICATE OF CORRECTION

PATENT NO. : RE. 31,535

DATED : March 13, 1984

INVENTOR(S) : Louis C. Schleicher

It is certified that error appears in the above-identified patent and that said Letters Patent is hereby corrected as shown below:

Column 6, line 62, delete "operatie" and insert --operative--

Column 8, line 39, after "retract" insert --stroke--.

Signed and Sealed this

*Fifth* Day of *March 1985*

[SEAL]

*Attest:*

DONALD J. QUIGG

*Attesting Officer* *Acting Commissioner of Patents and Trademarks*